Nov. 28, 1950 G. H. DARRELL 2,531,613
TARGET-THROWING MACHINE
Filed May 22, 1946 5 Sheets-Sheet 2

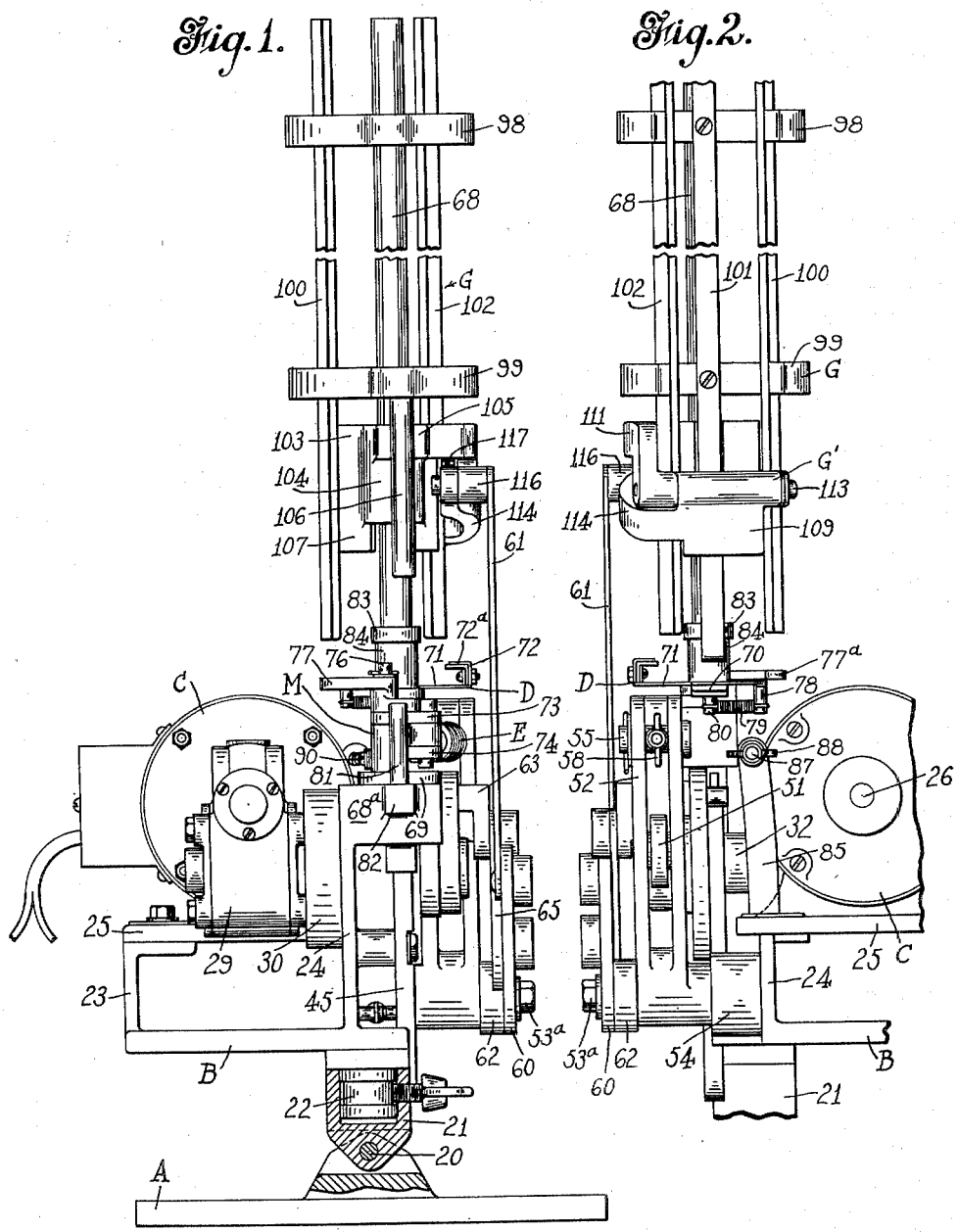

Inventor
George H. Darrell
By Rockwell & Bartholow
Attorneys

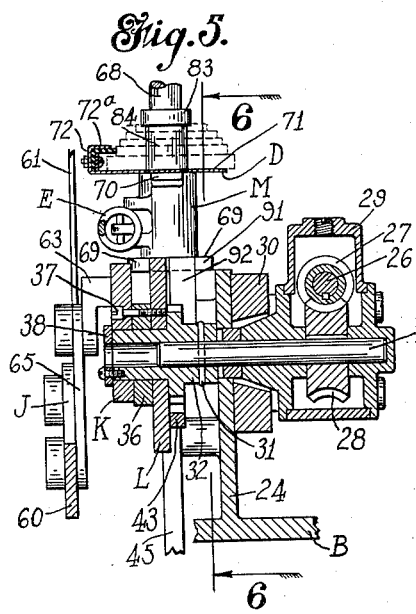
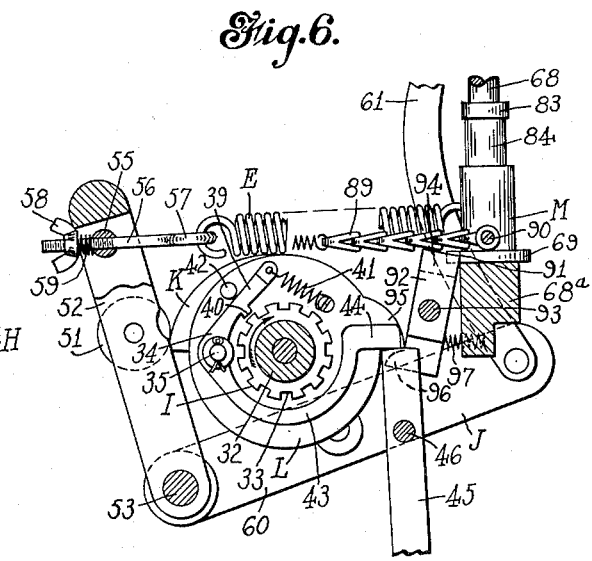
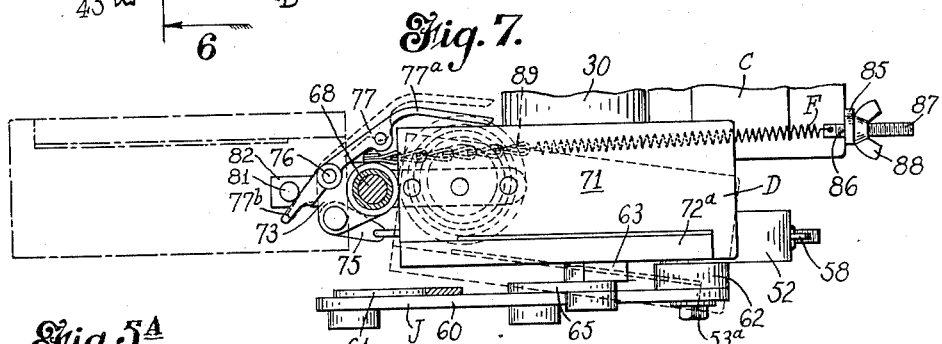
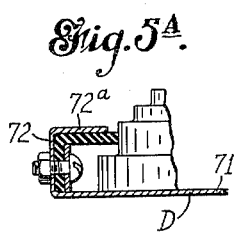
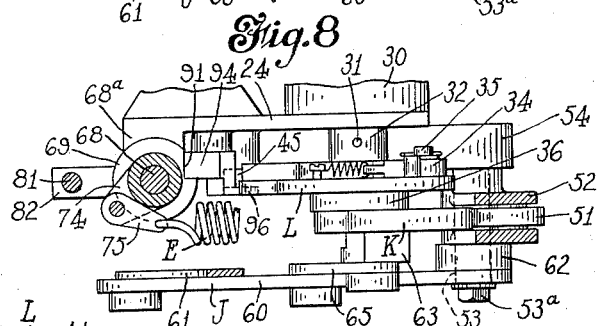
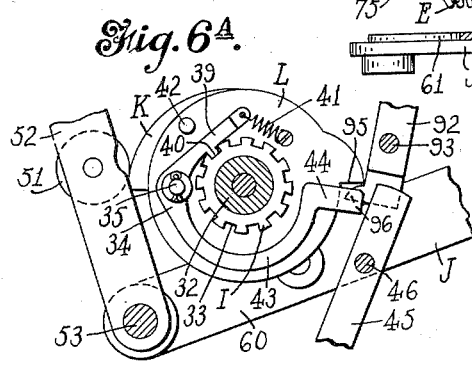

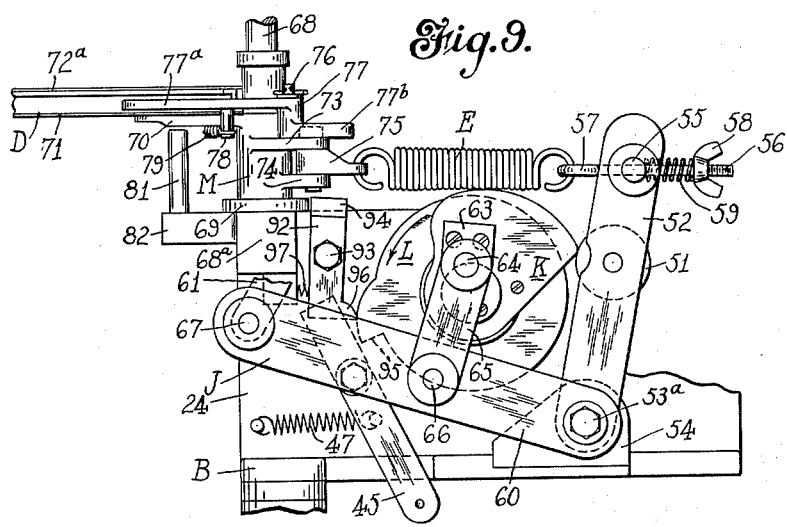
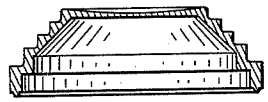
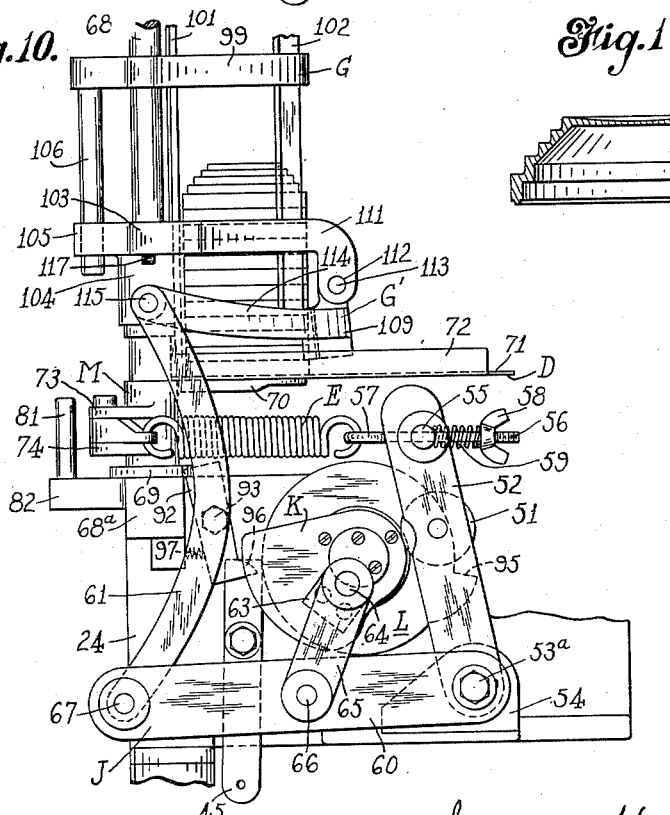

Nov. 28, 1950 G. H. DARRELL 2,531,613
TARGET-THROWING MACHINE
Filed May 22, 1946 5 Sheets-Sheet 5
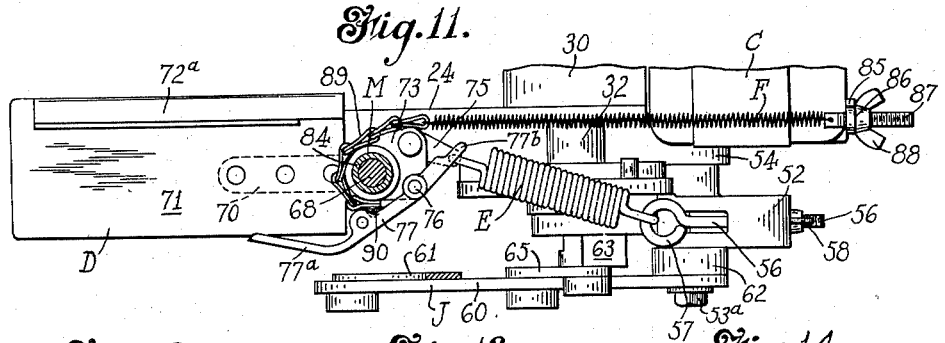
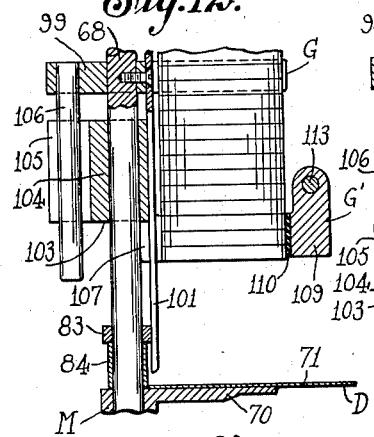
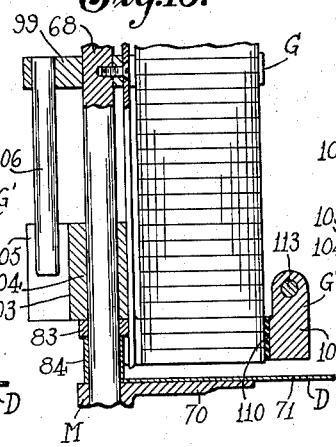
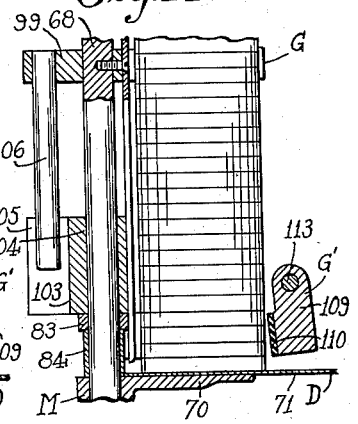
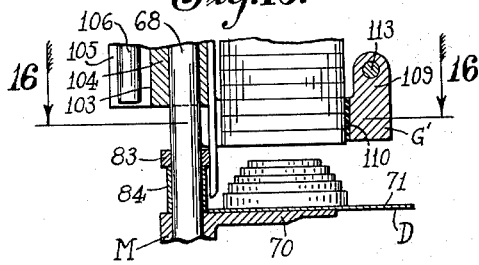
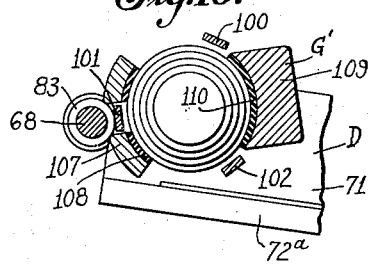
Inventor
George H. Darrell
By Rockwell & Bartholow
Attorneys Patented Nov. 28, 1950

2,531,613

UNITED STATES PATENT OFFICE 2,531,613

TARGET-THROWING MACHINE

George H. Darrell, Stonington, Conn.

Application May 22, 1946, Serial No. 671,480

10 Claims. (Cl. 124—8)

This invention relates to target-throwing machines, and more particularly to those of the type in which the target, which is preferably in the form of a so-called clay pigeon, is thrown from the machine by a swinging throwing arm upon the upper surface of which the pigeon is placed.

One of the objects of the invention is to improve the machine and enlarge its scope.

Another object is to provide a machine in which a number of operations which previously have been performed by hand are performed mechanically by power-operated means.

Another object is to provide a machine which is quite rapid in its operation.

Other objects are to improve the throwing mechanism and to improve the supplying of targets to the throwing mechanism.

To these and other ends the invention consists in the novel features and combinations of parts to be hereinafter described and claimed.

In the accompanying drawings:

Fig. 1 is a front end elevation of a machine embodying my improvements, certain parts being shown in section;

Fig. 2 is a rear elevation with certain parts broken away;

Fig. 5 is a section on line 5—5 of Fig. 3;

Fig. 5A is a detail showing on a larger scale certain parts shown in Fig. 5;

Fig. 6 is a section on line 6—6 of Fig. 5;

Fig. 6A is a detail section showing parts illustrated in Fig. 6, with the dog clutch engaged;

Fig. 7 is a section on line 7—7 of Fig. 3;

Fig. 8 is a section on line 8—8 of Fig. 3;

Fig. 9 is a view somewhat similar to Fig. 3 with parts omitted, the throwing arm being in the released position;

Fig. 10 is a view somewhat similar to Fig. 3, showing a stack of targets in the magazine, and showing a stage in the operation which is subsequent to that shown in Fig. 9;

Fig. 11 is a view similar to Fig. 7, but showing in full lines the released or projected position of the throwing arm;

Figure 3:
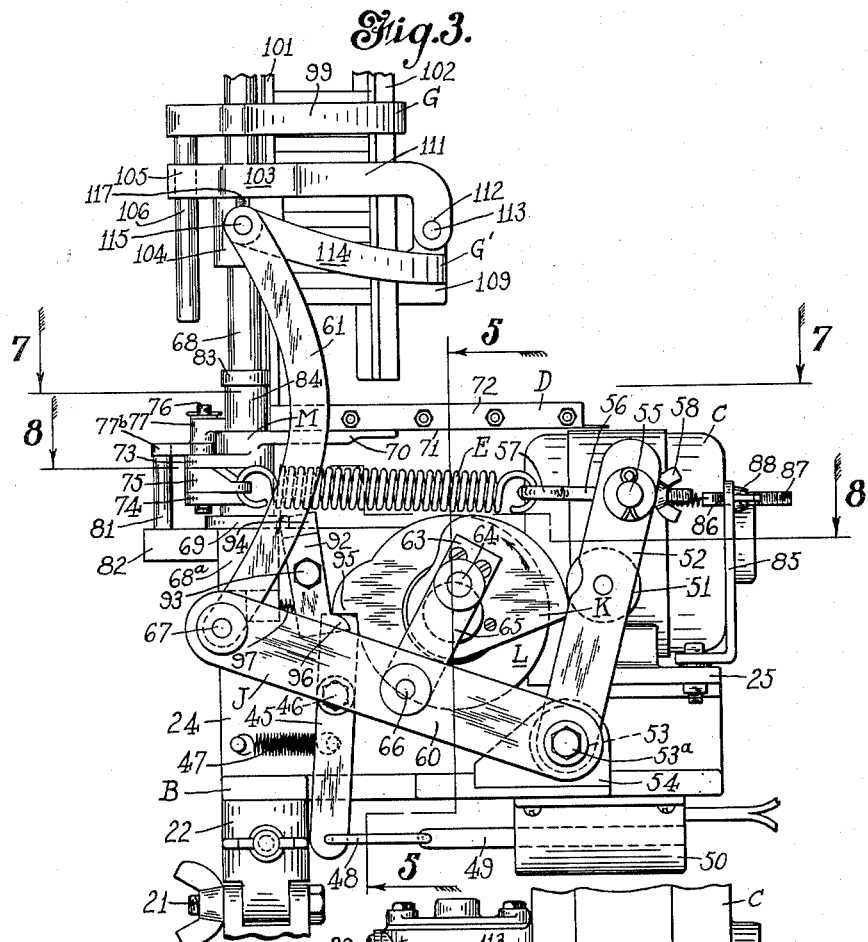
Fig. 3 is a side elevation on a larger scale, with parts broken away.
Figure 4:
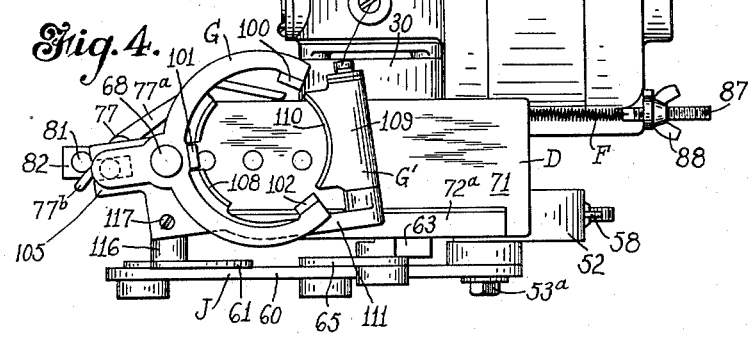
Fig. 4 is a top plan view with certain parts broken away, this view as well as the preceding views showing the machine in the set or cocked position, ready to throw a target.

Figs. 12 to 15, inclusive, are vertical sectional views showing the magazine holding a stack of targets and illustrating different stages in the operation of the target feeding mechanism;

Fig. 16 is a section on line 16—16 of Fig. 15; and

Fig. 17 is a vertical sectional view of a target of a kind which can be used in the machine.

In the machine which has been selected for illustration as a preferred embodiment of the invention, there is a base which is adapted to be held in place in any suitable location, which base has mounted upon it in an adjustable manner, as hereinafter described, a sub-base or frame that can be set at various angles to the horizontal and which carries the operative parts of the machine, including a constantly operating electric motor, a throwing arm mounted to swing in a lateral direction for throwing the target and acted upon by a spring and adapted to be cocked and released, a magazine adapted to hold a stack of nested targets and having means whereby the targets can be fed one by one into position on a table portion of the throwing arm, a tensioning means for the spring operable from the motor, an arm-releasing device operable from the motor, and a target-feed-controlling member operable from the motor. The machine also embodies a return spring for the throwing arm through the use of which the tensioning of the main spring is facilitated. The electric motor rotates constantly, there being a dog clutch between the motor-driven operating shaft on the one hand and two cams on the other hand, one of said cams being operable to tension the main spring and the other being operable to release the throwing arm, and the cam controlling the tensioning of the main spring having connections to the target-feeding means. The electric motor rotates constantly, and upon operation through a pushbutton or the like of a solenoid or like member, the machine, being in a set position, automatically goes through a predetermined cycle of operations initiated by throwing in of the dog clutch. In this cycle the throwing arm is released to throw a target which has previously been placed upon it, the throwing arm returned to the cocked or set position, and another target placed on the throwing arm, and at the end of the cycle, after all of the necessary operations have been completed, the dog clutch is released, leaving only the motor-driven shaft in movement.

In the drawings, the base is indicated at A, the sub-base or frame at B, the electric motor at C, the throwing arm at D, the main throwing arm spring at E, the return spring at F, and the target magazine at G. The motor-driven operating shaft is shown at H, the dog clutch at I. The target-feed-controlling member operable from the motor is indicated generally at J, the cam controlling the tensioning of the main spring at K, and the cam used in releasing the throwing arm at L.

Referring now to the details, the base A is of any suitable character and the mounting of the sub-base or frame B upon base A is similar to that disclosed in my Patent No. 2,245,258, the base having a horizontal pivot member 20 upon which is pivoted a lug 21, the lug being socketed and receiving a swivel member 22 carried by the frame B. The frame has an upstanding wall 23 at one side and a wall 24 of greater height at the other side, and also has a bed plate 25 upon which the electric motor C is mounted, the motor shaft being disposed longitudinally of the frame. The drive shaft H operable from the motor is disposed transversely to the frame, this shaft being driven from the motor shaft 26 through a worm 27 and worm wheel 28 arranged within a gear casing 29. The gear casing 29 is spaced from the wall 24 of the frame by means such as a spacer 30, and the shaft H extends through an opening in the wall 24 and has a portion at the opposite side of said wall relatively to the motor, as shown in Fig. 5. To this portion of the shaft H is fixed, as by a pin 31, a sleeve-like member 32 forming a part of the dog clutch I. The member 32 has peripheral notches 33 adapted to be engaged by a pivoted dog clutch member 34. The member 34 is pivoted intermediate of its ends by a pivot member 35 to the adjacent face of the releasing cam L. The releasing cam L and the tensioning cam K are mounted on an extension of sleeve member 32 so as to be freely rotatable thereon, and between cams K and L is a spacer member 36. The two cams and the spacer member 36 may be rigidly interconnected by suitable means such as the screw 37. A cap 38 on the end of the sleeve 32 holds the cam assembly from dislocation. The pivot member 35 is suitably secured to the cam L. The dog clutch member 34 has an upper part 39 provided with a tooth 40 for engagement with any one of the notches 33. A spring 41 acts upon the upper end of clutch member 34 (Fig. 6), and a fixed pin 42 adjacent the upper end of the clutch member is adapted to limit its swinging movement. Below the pivot member 35 the clutch member 34 has a curved portion 43, and this curved portion is provided with a terminal lug 44 adapted to be engaged by a pivoted latch member 45. This latch member is pivoted to frame B by a pivot 46 located intermediate the ends of the latch member, and a spring 47 (Fig. 3) acts on the latch member at a point below its pivot. The lower end of the latch member is connected by a link 48 to a sliding core 49 of a solenoid 50 having leads connected to a suitable pushbutton switch, not shown, through actuation of which the latch member 45 may be actuated.

The main spring E is connected to the throwing arm D in the manner hereinafter described, and this spring can be tensioned through the action of the cam K. This cam has its edge portion in engagement with a follower or roller 51 carried by a lever 52 intermediate of the ends of said lever. The lower end of the lever is pivoted on a pivot member 53 attached to the frame B by a bracket 54 (Fig. 10). The upper end of the lever 52 is attached to one end of the spring E. The lever 52 is a duplex lever having an intermediate space in which the follower 51 is received. In the upper part of the lever is a rockable pin 55 adapted to oscillate on a horizontal axis. This pin has a through perforation in its middle portion in which is located an eye bolt 56. The spring E is a helical spring, and its rear end is connected to the eye 57 of the eye bolt 56. The eye bolt has a threaded rear end portion engaged by a wing nut 58, and between wing nut 58 and pivot member 55 is disposed a cushioning spring 59 (Fig. 6).

The target-feed-controlling member J, previously mentioned, includes in its structure a pivoted lever 60 having a lower end pivoted to the frame B and having an upper end connected to a link 61, which link 61 has the action hereinafter described. The lower end of the lever 60 (Fig. 3) is pivoted coincidently with the lever 52, and for this purpose the pivot member 53, previously mentioned, is extended outwardly from the lower end of the lever 52, so that it can be engaged by lever 60. Between the two levers a suitable spacer 62 is arranged, as shown in Fig. 2. A screw 53a, having a head adjacent the outer face of the lever 60, is screwed into the pivot member 53.

Lever 60 is swung through a connection with the drive shaft H, and in this particular embodiment the connection is made through the cam K, which has applied to its outer face a block 63, from which projects a pin 64 engaging pivotally the upper end of a pitman or connecting rod 65, the lower end of which is pivotally connected to the lever 60 intermediate of the ends of said lever by a pivot pin 66. As shown in Fig. 3, the left-hand end of lever 60 is pivoted by a pivot member 67 to the lower end of the link 61, which connects the lever 60 with the target-feed mechanism.

The throwing arm D is pivoted for swinging movement about an upright axis, and in the form shown the pivot member for the arm is provided by a post or spindle 68 projecting upwardly from the frame B, said post or spindle being extended upwardly beyond the throwing arm so as to serve as a mounting for the target magazine G. This post extends upwardly from the upper face of a bracket 68a on the frame B, and the throwing arm is mounted on the post adjacent the upper face of the bracket by means of a sleeve structure generally indicated at M and having the features now to be described. The sleeve structure includes a collar or flange 69 at the lower part thereof, which serves as a detent for the throwing arm, and the structure includes an arm or lug 70, integral with the body of the sleeve, which projects laterally from the sleeve and serves for the attachment of the body 71 of the throwing arm D. The body of the throwing arm is in the form of a flat table of thin metal, and the lug 70 is fastened to this by riveting, or in some other suitable manner. Along one side of the table of the arm extends a rail 72, which, as shown in Fig. 5A, presents an overhanging flange 72a. The rail is provided with rubber or like lining material, the edge of the lining layer being adapted to contact the side of the pigeon in the manner shown in Fig. 5A.

The sleeve structure M also includes integral outstanding upper and lower lugs 73 and 74 by means of which the sleeve is connected to the forward end of the main spring E. Between the lugs 73 and 74 is a pivotally mounted arm 75 having an outer end to which the spring E is connected. The lug 73 also has a laterally extended part from the upper surface of which projects a pin 76, which serves as a pivotal mounting for a laterally swinging target-positioning finger 77. The finger 77 is pivoted between its ends, having a higher portion 77a slightly above the level of the table of the throwing arm, and having a short portion 77b in a lower plane at the opposite side of the finger pivot. Depending from the portion 77a, intermediate of the ends thereof, is a pin 78 connected to a light helical spring 79 at one end, the opposite end of the spring being connected to a stud 80 projecting downwardly from the arm table. The short lower portion 77ᵇ of the finger 77 is adapted to cooperate in the manner hereinafter described, with an upwardly projecting pin 81 mounted on a small bracket 82 and disposed somewhat forwardly of the post 68 on which the throwing arm is pivoted. A collar 83 is fixedly applied to the post 68 at a point somewhat above the upper surface of the throwing arm table, and a suitable spacing member 84 is interposed between the collar and the upper surface of the table, the spacer being free to turn on the post.

The return spring F is a helical spring which is considerably lighter than the main spring E. It extends generally in a longitudinal direction with respect to the frame of the machine, its rear end being suitably connected to the frame and its forward end being suitably connected to the sleeve M. In the case shown, the rear end of this spring is connected to a bracket 85 projecting upwardly from the rear end portion of the machine frame, said bracket having a perforation 86 therein, in which is loosely received a threaded spindle 87. The spring is connected to the inner end of the spindle 87, and on the outer end portion of the spindle is a nut 88, the arrangement being such that by adjusting the nut the tension of the spring can be adjusted. The forward end portion of the spring F is connected to a chain length 89, and the chain length is connected at its forward end to the sleeve M, in a suitable manner, as by means of a fastening screw 90. The chain portion is of a character such that it can conform itself to the peripheral portion of the sleeve M. In the embodiment shown, the point of attachment of the chain to the sleeve is approximately opposite the point where the main spring has a swivel connection to the sleeve, as appears in Fig. 11, from which it is seen that in the released position of the throwing arm the chain is wrapped about the sleeve to a certain extent, the return spring being generally longitudinal to the machine frame, and the main spring at an angle to the longitudinal axis of the frame.

The flange 69, which forms a part of the sleeve M, is provided, at a point below and substantially in line with the lug 70, with an angular notch 91 (Fig. 8). This notch is a detent notch by means of which the throwing arm can be held in the cocked position. Cooperating with the notch is a pivoted detent 92 consisting of a short lever pivoted to the frame intermediate of the ends of the lever, as shown at 93, and having at its upper extremity a rectangular block-like portion 94, one corner of which is adapted to fit into the notch in order to prevent movement of the sleeve in an arm-releasing direction. The detent 92 can, however, be swung out of the detent notch by movement of the cam L. This cam is generally in the plane of the detent 92, and the cam has a shoulder 95 disposed substantially radially with respect to its periphery and adapted to engage the curved surface of a releasing projection 96 on detent 92. A spring 97 acting on detent 92 tends to hold the detent engaged with the sleeve, but upon rotation of the cam L the shoulder 95 can engage projection 96 for the purpose of releasing the sleeve, whereupon the arm is thrown forwardly under the action of its spring.

The magazine G comprises an upright guideway adapted to receive a stack of nested targets, the guideway being supported upon the post 68 and having associated with it, adjacent the lower part of the guideway, a gripping device adapted to grip the stack at the lower part of the stack, said gripping device being controlled from the drive shaft through the lever 60 and the link 61. The guideway comprises a generally U-shaped member 98 fixed to the post 68, near the upper end of the post, and a similar U-shaped member 99 fixed to the post in a location somewhat above the location of the stack-gripping device. The stack-gripping device is generally indicated at G', and this device is movable vertically within certain limits, being guided in its vertical movement by the post 68, as hereinafter described. The two U-shaped members 98 and 99 of the guideway serve for the attachment of elongated guide strips 100, 101, 102, which guide strips serve as a means for preventing dislocation of the stack of targets. The targets are introduced into the guideway from the top of the latter. Usually a plurality of targets nested together are introduced into the guideway, entering the guideway from the top and being lowered until they engage the gripping device so as to be supported thereby.

The stack-gripping device comprises a frame 103 that has a sleeve portion 104 engaging the post 68 so as to be guided thereon. The frame also has a fork-shaped portion 105 engaging a pin 106 depending from the guideway member 99, the arrangement being such that the frame, while free to move vertically on the post 68, cannot turn with reference thereto. The frame 103 is provided adjacent the post 68 with a lower portion 107 having a lining 108 of rubber or other suitable material for engagement with the side of the stack, this portion of the frame providing a fixed gripping jaw for the stack, said gripping jaw being adapted to cooperate with an oppositely placed movable gripping jaw 109 having a gripping lining 110. The frame 103 is provided at one side, and adjacent the upper portion thereof, with a rearwardly extending fixed arm 11, the rear end of which is downturned and provided with a hole 112 which serves to receive a pivot pin 113, which is the pivot member for the movable gripping jaw 109. The pin 113 is fixed in the arm 111 and extends laterally from said arm, and the jaw 109 extends laterally from said arm, and the upper part of the jaw is arranged to swing on the pin so that the jaw can grip the stack, as shown in Fig. 13, or release the stack, as shown in Fig. 14. The jaw is continued forwardly at that side which is below the arm 111, so as to provide in effect a forwardly projecting arm on the jaw. This arm is indicated at 114, and at its forward end it is pivoted to the upper end of the link 61 by means of a pin 115, a spacer 116 being interposed between the link and the arm around the pin. The arm 114 at its forward end is adapted to engage at its upper surface with a screw 117 depending from the arm 111. The screw 117 is accessible at the upper surface of the arm 111 and can be adjusted up and down, and provides an adjustable stop adapted to be engaged by the arm 114 when the link 61 is raised by the operation of the crank mechanism associated with the lever 60.

When the machine is set for operation, it has the position shown in Figs. 1 to 4, inclusive. The stack of targets has the position shown in Fig. 3, the lowermost target being gripped by the gripper and being at a substantial elevation above the throwing arm. Should the machine be emptied of targets, it can be reloaded when in the position of Fig. 3, the stack of targets being lowered to the position there shown. Upon actuating the solenoid 50 in the manner hereinbefore indicated, the pivoted latch member 45 has its lower end drawn to the right (Fig. 3) against the action of spring 47, thus causing its upper end to be moved to the left (Fig. 3), which movement permits dog clutch member 34 to move to the position shown in Fig. 6A, by the action of gravity acting upon the lower part of the dog, and the spring 41 acting upon the upper part thereof. Thus the tooth 40 is moved into one of the notches 33 and the clutch engaged, initiating rotation of the cams L and K in a counterclockwise direction with reference to Fig. 3. Thereupon follows at once the release of the pivoted detent 92 and of the throwing arm in the manner previously indicated. It is assumed that a target has been placed on the throwing arm by the previous actuation of the machine, and thus when the arm is released this target is thrown. The target, being against the arm table rail, is rotated on its axis and is thrown off of the forward end of the arm as the arm moves from the position of Fig. 4 to the position shown in Fig. 11. In this action the main spring E is contracted and the return spring F is extended, and the latter spring has its chain wrapped around the sleeve M in the manner shown in Fig. 11. The arm D, after throwing off the target, is moved somewhat farther than shown in Fig 11, but the link 61 is curved so that there will not be any interference in the position of maximum throw. Due to the action of the return spring F, the arm is then moved rapidly back to the position indicated by the dotted lines in Fig. 7, in which position it will be under the target stack. In the rearward dotted-line position of the arm in Fig. 7, the rail flange 72a will be in such a location that it will not interfere with the dropping of a target onto the arm. It will also be noted that in this dotted-line position of the arm (Fig. 7) the spring finger 77 will have a corresponding position, shown by dotted lines, in which it will not interfere with the dropping of a target onto the arm. This movement of the spring finger 77 is caused by the engagement of its extension 77b with the pin 81 at the time the arm is moved to the dotted-line position (Fig. 7). When the arm is moved to this last-mentioned position, the detent notch 91 has been moved to a point where re-engagement with the detent 92 can occur.

During the movements which have been described above, the pin 64, which is in the nature of a crank, has been shifting its position due to rotation of cam K. The movement of lever 60 is initially slight, but a little later on the lever 60 has a greater downward movement, and this is effective to lower the target stack in its guideway. The stack is held up by the link 61 initially, the weight of the gripper being held by the engagement of screw 117 against the forwardmost part of the arm 114, the gripper being held up and its movable gripping jaw being held closed. After this, the stack holding frame member 103 comes down to engage and rest upon the collar 83, to thereby arrest bodily movement of the frame member, but as the arm 114 is moved downwardly out of engagement with the adjusting screw, the arm 114 is swung on the pin 113 as a pivot, thus opening the swinging jaw member 109 and permitting the stack to drop on the upper surface of the table of the arm. This drop is from the position shown in Fig. 13 to that shown in Fig. 14. At this time the lever 60 is about in its lowermost position, as shown in Fig. 10. Thereafter, on further movement, jaw 109 is moved to grip the stack without touching the lowermost target, so that this target can remain on the arm as shown in Fig. 15. Further movement will result in the link 61 contacting screw 117 again and raising the stack. At the same time that the jaw 109 reengages the stack, the link 61, acting against screw 117, starts the upward movement of the stack.

About the time that the stack is about half way to its upper position, the spring-tensioning cam K commences to engage the follower 51, and as the cam continues its rotation the lever 52 is swung to put tension on the spring E, causing the arm D to swing to position to engage its detent notch 91 with the detent 92. The spring finger 77 will then have its longer arm moved by its spring 79 into position to engage the free target at the periphery of the target and move it over against the arm rail so that it will be in the proper position on the throwing arm. Thereafter, the spring E will be fully tensioned by the movement of the tensioning cam K, and the shoulder 95 on cam L will be moving back toward its initial position. The solenoid core 49, having been released by removal of the finger from the pushbutton, the latch member 45 will be riding at its free end against the periphery of the cam L. As the cam L rotates, the terminal lug 44 on dog clutch 34 will come against the upper end of latch 45, and this will release the dog clutch member 34. At the time that the dog clutch is released the shoulder 95 on cam L comes back to the position shown in Fig. 3.

In tensioning the spring E the rise of the cam surface engaging follower 51 is progressive up to a certain point, and it is preferred to stop this progressive rise short of the final position shown in Fig. 3, and to have a slight reverse curve at the final point of engagement with the follower. In this way any tendency of the cam to reverse its direction of rotation is overcome.

The release of the main spring in a machine of this character requires the employment of a strong force. This is supplied by the electric motor which rotates the releasing cam after engagement of the clutch between the cam and the drive shaft. The solenoid is employed only for releasing the dog of the clutch. After the pigeon has been thrown, the throwing arm is moved back again to target-receiving position, because the main spring is without tension and the return spring is tensioned for the return movement and is free to act. On the throwing movement of the arm the return spring acts as a buffer or cushioning spring. By the construction described a high speed of operation is achieved with a minimum power requirement.

The full throwing swing of the arm is somewhat in excess of 180°, but usually not over 250°.

The spring finger 77, when the machine is in the set position, holds the pigeon firmly against the throwing arm rail regardless of the angle of elevation at which the machine frame is set.

The entire cycle of operation requires only one revolution of the drive shaft, and is, therefore, completed with great rapidity.

It will be apparent that by the invention the rapidity of operation and the scope of the machine are greatly increased in comparison to prior machines, and that hand manipulation is reduced to a minimum. After the machine has been set up, a comparatively large number of pigeons can be thrown successively merely by actuation of the clutch release latch. The machine does not require reloading until the magazine has been emptied, and reloading can be performed easily and quickly. In the operation of the machine, the adjustment for change of angles and elevation can be made very quickly and conveniently. The machine can readily be arranged so that it can be operated by the shooter himself, and shots of all types of angles and elevations, including low incoming targets, can be provided.

The machine is of relatively light weight and readily portable.

Only one kind of target is shown in the drawings, but this is by way of example only, and it is to be understood that the machine is operable in a satisfactory manner with targets of various shapes and sizes.

In the machine herein shown the throwing arm in the set position has its axis longitudinal to the machine and perpendicular to the drive shaft, and in the target-receiving position, shown in dotted lines in Fig. 7, it has been swung rearwardly into an over-center position, where it has a slight angle to a vertical plane longitudinal to the machine passing through the arm pivot.

Only one embodiment of the machine structure is shown herein, and it is to be understood that various changes in the organization of parts and in the structural details may be made without departing from the principles of the invention or the scope of the claims.

What I claim is:

1. A target trap comprising a motor supplying power to operate the trap; timed means driven by the motor; a pivotally mounted arm for throwing a target; a main power spring attached to the arm for moving the arm from a set position to a target releasing position; locking means for restraining the arm in the set position against the force of the spring; means for releasing the locking means so that the spring moves the arm to the target releasing position; spring loading means released by the timed means subsequent to movement of the arm thereby to reduce the remaining force in the main spring; a return spring for moving the arm to a target loading position upon the reduction of the main spring force; and a target magazine including griping means operated by the timed means to deposit a target upon the arm when the arm is in the loading position, the timed means then being effective to move the spring loading means to exert a loading force on the main spring thereby to move the arm from the loading position to the set position.

2. A target trap comprising a motor supplying power to operate the trap; a pivotally mounted arm for throwing a target; a main power spring attached to the arm for moving the arm from a set position to a target releasing position; locking means for restraining the arm in the set position against the force of the spring; cam means having a plurality of cammed surfaces, a clutch for selectively coupling the cam means to the motor thereby to move the cammed surfaces, one of the surfaces releasing the locking means so that the spring moves the arm to the target releasing position; spring tensioning means released by a second of the cammed surfaces subsequent to movement of the arm thereby to reduce the remaining tension in the main spring; a return spring for moving the arm to a target loading position upon the reduction of the main spring tension; a magazine including gripping means for holding a stack of targets; and a crank rotated by the motor for operating the gripping means to deposit a target upon the arm when the arm is in the loading position, the second cammed surface then being effective to move the spring tensioning means to exert a tensioning force on the main spring thereby to move the arm from the loading position to the set position.

3. A target trap comprising a motor supplying power to operate the trap; a pivotally mounted arm for throwing a target; a main power spring attached to the arm for moving the arm from a set position to a target releasing position; locking means for restraining the arm in the set position against the force of the spring; cam means for releasing the locking means so that the spring moves the arm to the target releasing position; a clutch having a plurality of teeth and a dog for engaging a random tooth to complete one operating cycle of the cam means; tripping means for selectively operating the dog; spring tensioning means released by the cam means subsequent to movement of the arm thereby to reduce the remaining tension in the main spring; a return spring for moving the arm to a target loading position upon the reduction of the main spring tension; and a target magazine including gripping means operated by the cam means to deposit a target upon the arm when the arm is in the loading position, the cam means then being effective to move the spring tensioning means to exert a tensioning force on the main spring thereby to move the arm from the loading position to the set position.

4. A target trap comprising a motor supplying power to operate the trap; target throwing means including an arm having a rail extending along one side thereof to guide the target, said arm being pivotally mounted at one end; a spring biased finger pivotally connected to said arm; a main power spring attached to the pivoted end of the arm for moving the arm from a set position to a target releasing position; locking means for restraining the arm in the set position against the force of the spring; timed means operated by the motor for releasing the locking means so that the spring moves the arm to the target releasing position; spring tensioning means released by the timed means subsequent to movement of the arm thereby to reduce the remaining tension in the main spring; a return spring for moving the arm to a target loading position upon the reduction of the main spring tension; a target magazine including gripping means operated by the timed means to deposit a target upon the arm adjacent the pivoted end thereof when the arm is in the loading position; and a projecting member contacting the spring biased finger to move it from under the target when the arm is in the loading position, the timed means then being effective to move the spring tensioning means to exert a tensioning force on the main spring thereby to move the arm from the loading position to the set position, the spring biased finger being released during the movement of the arm to the set position to force the target against the rail so that the target has a spinning movement imparted thereto by the rail upon movement of the arm to the target releasing position.

5. A target trap comprising a motor supplying power to operate the trap; timed means driven by the motor; a pivotally mounted arm for throwing a target; a main power spring attached to the arm for moving the arm from a set position to a target releasing position; locking means for restraining the arm in the set position against the force of the spring; means for releasing the locking means so that the spring moves the arm to the target releasing position; spring tensioning means released by the timed means subsequent to movement of the arm thereby to reduce the remaining tension in the main spring; a return spring for moving the arm to a target loading position upon the reduction of the main spring tension; a magazine including gripping means for holding a stack of targets; and means operated by said motor in synchronism with said timed means arranged successively to lower the stack of targets so that the bottom target is adjacent the throwing arm when the arm is in the loading position, to open the gripper means to drop the stack so that the bottom target rests upon the throwing arm, to close the gripper means to secure the next to the bottom target, and to raise the stack of targets so that they are out of the path of the throwing arm and the target remaining thereon; the timed means then being effective to move the spring tensioning means to exert a tensioning force on the main spring so that the arm is in position for throwing the target.

6. A target trap comprising a motor supplying power to operate the trap; a pivotally mounted arm for throwing a target; a main power spring attached to the arm for moving the arm from a set position to a target releasing position; locking means for restraining the arm in the set position against the force of the spring; cam means operated by the motor for releasing the locking means so that the spring moves the arm to the target releasing position; spring tensioning means released by the cam means subsequent to movement of the arm thereby to reduce the remaining tension in the main spring; a return spring for moving the arm to a target loading position upon the reduction of the main spring tension; a magazine including gripping means having a stationary jaw and a pivotally mounted movable jaw oppositely disposed to grip the bottom target of a stack; a lever the upper end of which normally contacts the stationary jaw to maintain the stack out of the path of the throwing arm, said lever end also being pivotally connected to said movable jaw to hold the jaw closed; a linkage operated by the motor in synchronism with said cam means to move the end of the lever downwardly when the arm is in the loading position thereby to lower the stack; and a stop contacting said stationary jaw when the bottom target is adjacent said throwing arm, the remaining travel of the linkage moving said lever to open the movable jaw thus depositing the target stack on the arm, the return movement of the linkage closing the movable jaw upon the next-to-the-bottom target and raising the stack out of the path of the arm, the cam means then being effective to move the spring tensioning means to exert a tensioning force on the main spring thereby to move the arm from the loading position to the set position.

7. In a target trap, the combination with a power source and a projector arm, movable from a retracted position to a target throwing position, of a magazine feed comprising gripping means for holding a stack of targets, lever means including a linkage operated by said power source successively to lower the stack of targets to rest upon the throwing arm when the arm is in the loading position, to open the gripper means to drop the stack so that the bottom target rests upon the throwing arm, to close the gripper means to secure the next to the bottom target, and to raise the stack of targets so that the cocking and firing of arm may be accomplished without interference with the stack.

8. In a target trap, the combination with a power source and a projector arm, movable from a retracted position to a target throwing position, of a magazine feed comprising gripping means having a stationary jaw and a pivotally mounted movable jaw oppositely disposed to grip the bottom target of a stack, a lever the upper end of which normally contacts the stationary jaw to maintain the stack out of the path of the throwing arm, said lever end also being pivotally connected to said movable jaw to hold the jaw closed; a crank operated by the power source to move the end of the lever downwardly when the arm is in the loading position thereby to lower the stack, and a stop contacting said stationary jaw when the bottom target is adjacent said throwing arm, the remaining travel of the crank moving said lever to open the movable jaw thus depositing the bottom target on the arm, the return movement of the crank closing the movable jaw upon the next-to-the-bottom target and raising the stack so that the cocking and firing of arm may be accomplished without interference with the stack.

9. In a target trap, the combination with a projector arm, movable from a retracted position to a target throwing position, of a magazine feed comprising a laterally supporting member for holding a stack of targets in superposed relation over said arm when in a retracted position, gripper elements relatively movable from a target gripping to target releasing position and arranged to engage the lowermost target of the stack thereby to support said stack above said arm, mechanism for lowering said gripper elements adjacent to the arm and effecting relative movement thereof when in target releasing position so as to deposit the entire stack on said arm, and means for elevating and effecting relative movement of said gripper element to target gripping position so that said gripper elements elevate all but said lowermost target which remains on said arm.

10. In a target trap, the combination with a projector arm, movable from a target throwing position to a retracted position, of a magazine feed comprising a laterally supporting member for holding a stack of targets in superposed relation over said arm when in a retracted position, gripper elements relatively movable from target gripping to target releasing position and arranged to engage the lowermost target of the stack thereby to support said stack above said arm, mechanism for lowering said gripper elements to a point slightly spaced above said arm and effecting relative movement of said gripper elements when in target-releasing position so as to drop said stack on said arm, and means for successively effecting relative movement of said gripper elements to target-gripping position and elevating said elements, thereby to lift all but said lowermost target from said arm.

GEORGE H. DARRELL.

(References on following page)

REFERENCES CITED

The following references are of record in the file of this patent:

UNITED STATES PATENTS

| Number | Name | Date |
|---|---|---|
| 554,990 | Davis | Feb. 18, 1896 |
| 947,299 | Fridell | Jan. 25, 1910 |
| 1,369,948 | Vickery | Mar. 1, 1921 |
| 2,245,258 | Darrell | June 10, 1941 |
| 2,267,525 | Kemp | Dec. 23, 1941 |
| 2,310,746 | Parker et al. | Feb. 9, 1943 |

FOREIGN PATENTS

| Number | Country | Date |
|---|---|---|
| 406,722 | Great Britain | Feb. 28, 1934 |